United States Patent
Drinkwater et al.

(10) Patent No.: US 9,858,037 B1
(45) Date of Patent: Jan. 2, 2018

(54) METHOD FOR CHANGING TYPE OF STREAMED CONTENT FOR AN AUDIO SYSTEM

(71) Applicant: Bose Corporation, Framingham, MA (US)

(72) Inventors: Don L. Drinkwater, Carlisle, MA (US); Michael Elliot, Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/277,444

(22) Filed: Sep. 27, 2016

(51) Int. Cl.
  H04B 3/00  (2006.01)
  G06F 3/16  (2006.01)
  H04R 3/12  (2006.01)

(52) U.S. Cl.
  CPC ............ *G06F 3/165* (2013.01); *H04R 3/12* (2013.01); *H04R 2420/07* (2013.01)

(58) Field of Classification Search
  CPC ........ G06F 3/165; H04R 3/12; H04R 2420/07
  USPC .......................................................... 381/77
  See application file for complete search history.

(56) References Cited

U.S. PATENT DOCUMENTS

| | | |
|---|---|---|
| 6,449,226 B1 | 9/2002 | Kumagai |
| 7,483,538 B2 | 1/2009 | McCarty et al. |
| 7,643,894 B2 | 1/2010 | Braithwaite et al. |
| 7,917,082 B2 | 3/2011 | Goldberg et al. |
| 8,234,395 B2 | 7/2012 | Millington |
| 8,588,949 B2 | 11/2013 | Lambourne et al. |
| 9,078,072 B2 | 7/2015 | Sundaresan et al. |
| 9,177,052 B2 | 11/2015 | Gomes-Casseres et al. |
| 9,330,169 B2 | 5/2016 | Gomes-Casseres et al. |
| 9,438,359 B2 * | 9/2016 | Haslam ................. H04H 20/20 |
| 2006/0182412 A1 * | 8/2006 | Lefevre .................... H04N 5/76 386/282 |
| 2011/0138022 A1 * | 6/2011 | Xie ..................... H04L 65/1083 709/219 |
| 2012/0176872 A1 | 7/2012 | Waites |
| 2015/0100142 A1 | 4/2015 | Alders et al. |
| 2016/0156687 A1 * | 6/2016 | Leung ................. H04L 67/2819 709/219 |
| 2016/0381411 A1 * | 12/2016 | Drake ............... H04N 21/4312 725/61 |

OTHER PUBLICATIONS

U.S. Appl. No. 15/087,021, filed Mar. 31, 2016 entitled "Clock Synchronization for Audio Playback Devices" applicant Bose Corporation.

* cited by examiner

*Primary Examiner* — Quynh Nguyen
(74) *Attorney, Agent, or Firm* — Brian M. Dingman; Dingman IP Law, PC (57) ABSTRACT

A method for changing types of streamed content for an audio system in which a first type of streamed content that has a first signal type is received at the audio system and arrangements are made to begin receiving at the audio system a second type of streamed content, where the second type of streamed content has a second signal type that is different than the first signal type.

20 Claims, 7 Drawing Sheets

METHOD FOR CHANGING TYPE OF STREAMED CONTENT FOR AN AUDIO SYSTEM

BACKGROUND

This disclosure relates to methods of changing streamed content for an audio system.

Audio systems such as wireless audio playback devices can in some cases play streamed audio data that is available from sources such as internet radio stations. Portable computing devices such as tablets and smart phones are often used to route audio data to the playback device, using a technology for wirelessly exchanging data over short distances, such as Bluetooth.

SUMMARY

All examples and features mentioned below can be combined in any technically possible way.

In one aspect, a method for changing types of streamed content for an audio system includes receiving at the audio system a first type of streamed content that has a first signal type and arranging to begin receiving at the audio system a second type of streamed content, where the second type of streamed content has a second signal type that is different than the first signal type.

Embodiments may include one of the following features, or any combination thereof. The first signal type may be of a first communication protocol and the second signal type may be of a second communication protocol, where the first and second communication protocols are different from one another. The first communication protocol may employ a wireless technology for exchanging data over short distances; the first communication protocol may be a Bluetooth wireless technology. The second communication protocol may employ a wireless local area network; the second communication protocol may be a WiFi technology.

Embodiments may include one of the following features, or any combination thereof. The audio system may be a wireless audio playback device. Arranging to begin receiving at the audio system a second type of streamed content may comprise receiving at the audio system from a user a command to switch to the second type of streamed content. The first type of streamed content may originate from a first digital audio source, and arranging to begin receiving at the audio system a second type of streamed content may comprise detecting by the audio system a change in at least one of the first digital audio source and the first signal type. The change in at least one of the first digital audio source and the first signal type may comprise at least one of a change in signal strength, a change in signal buffering and a change in power level of the first digital audio source.

Embodiments may include one of the following features, or any combination thereof. The first type of streamed content may originate from a first digital audio source, and arranging to begin receiving at the audio system a second type of streamed content may comprise identifying the first digital audio source. The first signal type may be of a first communication protocol, and identifying the first digital audio source may comprise reviewing data that is specific to the first digital audio source in the first type of streamed content, and arranging to begin receiving at the audio system a second type of streamed content may further comprise arranging for the delivery to the audio system of streamed content from the first digital audio source over a second communication protocol, where the first and second communication protocols are different from one another. The first communication protocol may employ a Bluetooth wireless technology and the second communication protocol may employ a WiFi technology. Identifying the first digital audio source may comprise polling a plurality of different digital audio sources. A user of the audio system may have an account with the first digital audio source, and polling a plurality of different digital audio sources may comprise screening the plurality of different audio sources to identify one or more audio sources with which the user has an account. Identifying the first digital audio source may further comprise selecting one identified digital audio source with which the user has an account based on an identification of the first type of streamed content that is being streamed to the audio system by the digital audio source.

Embodiments may include one of the following features, or any combination thereof. The first type of streamed content may originate from a first digital audio source and include content metadata, and arranging to begin receiving at the audio system a second type of streamed content may comprise using the metadata with a second digital audio source. Using the metadata with a second digital audio source may comprise seeding a second digital audio source with the metadata, so that the second digital audio source provides digital audio data that is similar to the first type of streamed content. The audio system may play the streamed content as audio output, and the first type of streamed content may comprise a plurality of sequential tracks of content data, and arranging to begin receiving at the audio system a second type of streamed content may comprise beginning to play the second type of streamed content after one track has played and before the next sequential track begins to play. Arranging to begin receiving at the audio system a second type of streamed content may comprise using information in the first type of streamed content to identify the second type of streamed content.

In another aspect a method for changing types of streamed content for a wireless audio playback device includes receiving at the wireless audio playback device a first type of streamed content that has a first signal type with a first communication protocol that employs a Bluetooth wireless technology, arranging to begin receiving at the wireless audio playback device a second type of streamed content, where the second type of streamed content has a second signal type with a second communication protocol that is different than the first communication protocol, wherein the second communication protocol employs a WiFi technology. Arranging to begin receiving at the audio system a second type of streamed content comprises using information in the first type of streamed content to identify the second type of streamed content. The wireless audio playback device plays the streamed content as audio output, wherein the first type of streamed content comprises a plurality of sequential tracks of content data, and wherein arranging to begin receiving at the audio system a second type of streamed content comprises beginning to play the second type of streamed content after one track has played and before the next sequential track begins to play.

DETAILED DESCRIPTION

A portable computing device such as a tablet or a smart phone is often used to route digital audio data to an audio system such as a wireless audio playback device, using a technology for exchanging data over short distances such as Bluetooth. Bluetooth can only operate over short distances and uses device battery power. In the present methods, a content stream moving from a handheld device using Bluetooth can be transferred to WiFi. This removes the distance limitations inherent in Bluetooth, provides better quality audio, and prevents device battery life from affecting the audio playback.

Figure 1:
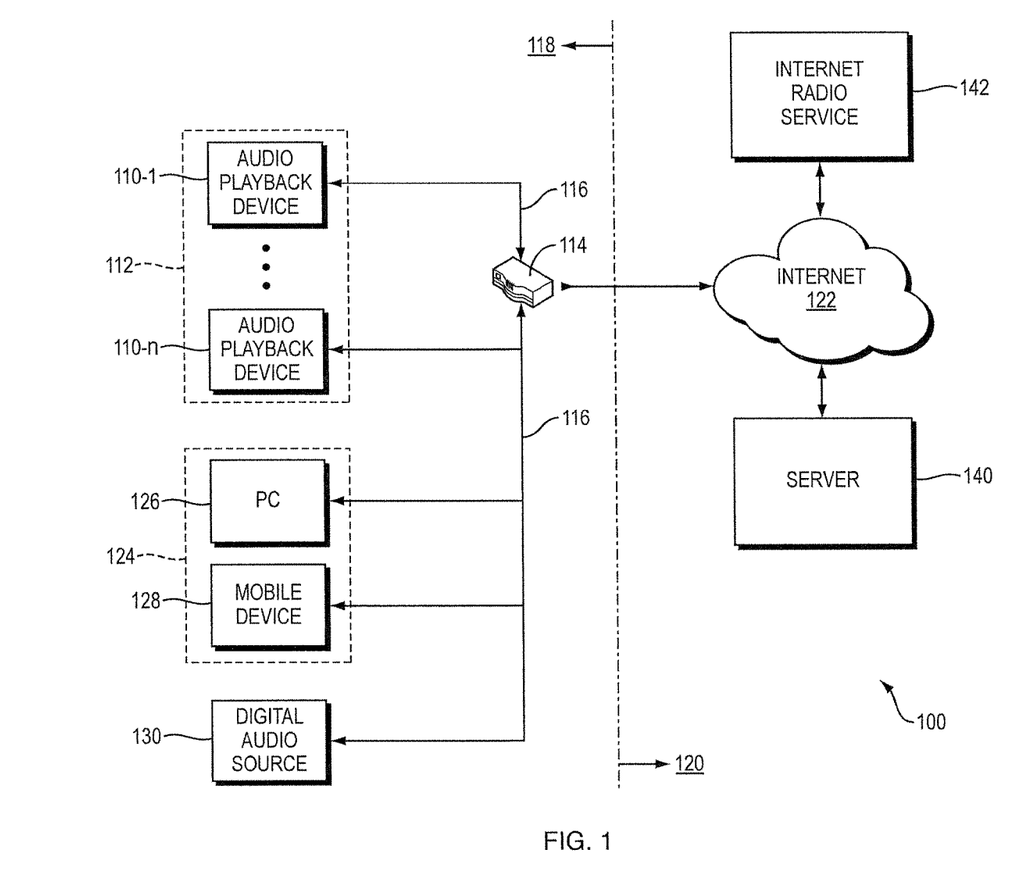
FIG. 1 is schematic block diagram of an audio distribution system that includes wireless audio playback devices.

Audio distribution system 100, FIG. 1, can be used to accomplish methods for changing the type of streamed content for an audio system. System 100 also includes wireless audio playback devices that can be involved in the subject methods. System 100 is adapted to deliver (i.e., play) digital multimedia such as digital audio (e.g., digital music). System 100 includes a number of audio systems such as audio playback devices 110-1-110-*n* (collectively referenced as 110), which are among the zone of audio output devices 112 of the system. In one non-limiting embodiment, the audio playback devices are identical devices that each include a digital to analog converter that is able to receive digital audio signals and convert them to analog form. The audio playback devices also include an electro-acoustic transducer that receives the analog audio signals and transduces them into sound. The audio playback devices also include a processor. The audio playback devices are connected to one another and also connected to the router/access point 114 via network 116. The audio playback devices are thus able to communicate with one another. Network 116 can be a wired and/or wireless network, and can use known network connectivity methodologies such as WiFi technology. The audio playback devices can also in some cases directly connect to one another using a wireless technology for exchanging data over short distances, such as a Bluetooth technology. Network 116 is part of LAN 118 which is connected to wide area network (WAN) 120, in this non-limiting example by connection to Internet 122. LAN 118 also includes one or more separate computing devices 124 and one or more separate local digital audio sources 130. In this non-limiting example the computing devices include a personal computer 126 and a mobile computing device 128 such as a smartphone, tablet or the like. WAN 120 includes but is not limited to server 140 and Internet audio streaming service 142 which can both communicate with the LAN via Internet 122.

One use of system 100 is to play digital audio data, including but not limited to streamed content (an audio stream), over one or more of the audio playback devices in zone 112. The sources of digital audio provide access to content such as audio streams that move over network 116 to the audio playback devices. The sources of such audio streams can include, for example, Internet audio streaming services and user defined playlists. Each of such digital audio sources maintains a repository of audio content which can be chosen by the user to be played over one or more of the audio playback devices. Such digital audio sources can include Internet-based audio streaming services such as Pandora®, Spotify® and vTuner®, for example. Network attached storage devices such as digital audio source 130, and media server applications such as may be found on a mobile computing device, can also be sources of audio data. In a non-limiting example, the user selects the audio source and the playback devices via PC 126 and/or mobile device 128.

When a user has chosen to have an audio stream played on more than one of the audio playback devices, in order for the music to be properly synchronized such that the same tracks are playing synchronously on all of the audio playback devices there needs to be appropriate and sufficient coordination among all of the active audio playback devices. One manner in which such coordination can be accomplished is to use one of the audio playback devices to control the distribution of audio data to all of the other active audio playback devices that are being used to play content. This device which controls audio data distribution to the other active audio playback devices can be considered a master device, and the rest of the active devices (i.e., the rest of the playback devices that are being used to play content) can be considered to be slave devices. In addition to an audio stream, the master device also provides control data (e.g., via a control data stream) to at least some of the slave devices. The control data includes timing information which enables the slave devices to synchronize playback of the streamed audio content with the master device. In one example, the control data includes a "play at" time, which corresponds to a time when the playback devices are to begin playback of the streamed audio data. Devices joining the playback group after playback has started may also use the "play at" time to determine where in the stream to begin playback in order to sync up with the playback devices in the group.

To help ensure that the playback of the audio content is and remains synchronized, the respective internal clocks of the individual playback devices are synchronized. In principle, such clocks comprise an oscillator and a counter. Clock synchronization of audio playback devices is further described in application Ser. No. 15/087,021, filed on Mar. 31, 2016, the entire disclosure of which is incorporated herein by reference.

In an existing multi-device system, such as disclosed in U.S. Pat. No. 9,078,072, the disclosure of which is incorporated herein by reference, when one or more playback devices are added to an already playing playback device, the result is the formation of a multi-device zone which is managed by the playback device that was initially playing the audio. All of the playback devices are clock synchronized. The audio data that gets distributed to the playback devices are time-stamped, and due to clock synchronization the audio is played synchronously at all playback devices. The manager of the zone is the master device, and its main functions are audio control and audio distribution. The remaining device(s) in the zone are referred to as slaves. The device which is responsible for the clock synchronization is called the clock master. The clock master is part of the same network as all the other devices (speakers), but may or may not be part of the same zone. In some cases the clock master can be the same as the master device, but it need not be.

The main roles of the audio master are audio distribution to and audio control of the slaves. The audio master establishes secure connections to each of the slaves in the zone. This connection may or may not be over the home router or access point, and the connection between each slave and the master may or may not be unique (i.e., the connection can be unicast or multicast). Time-stamped audio packets are then distributed over each of these connections to the individual slaves. The slaves use the time-stamps to play audio at the correct time. Apart from an audio distribution channel, there is also a control channel which is established between the audio master and the slave devices. The control channel is used to send out audio control messages. When playback is requested at the audio master, the audio master starts buffering the data before starting playback. During this time audio is also distributed to the slaves through the audio distribution channel.

Figure 2:
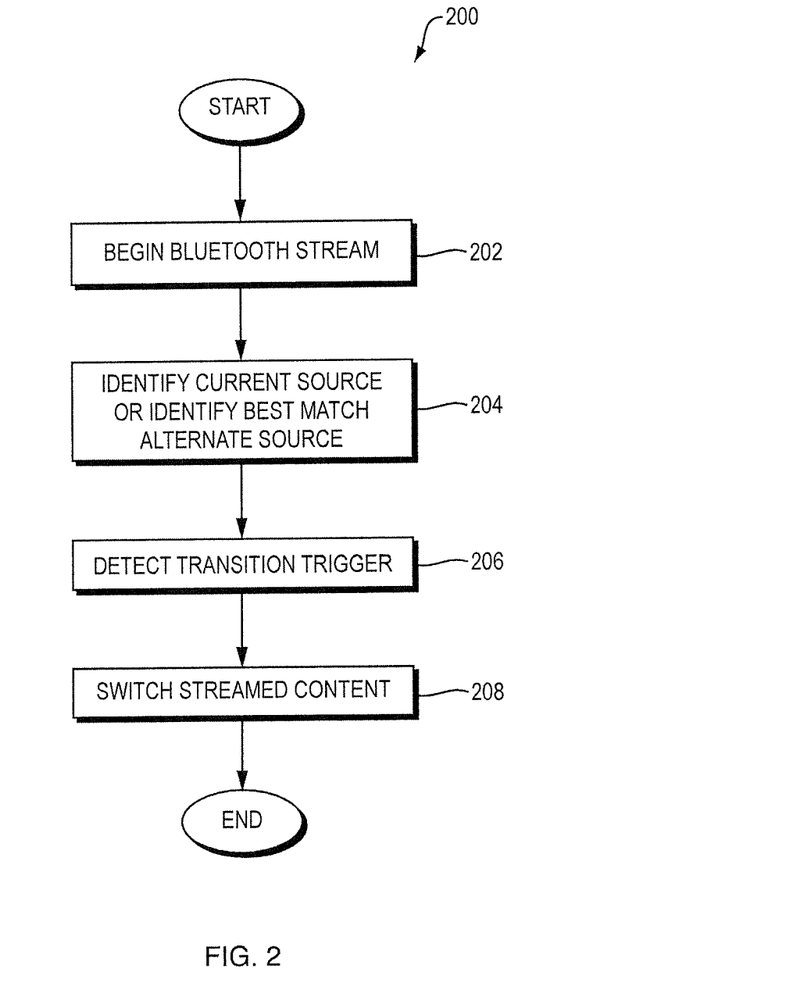
FIG. 2 is a flow chart of steps of a method for changing the type of streamed content for an audio system.

FIG. 2 discloses a method 200 for changing the type of streamed content for an audio system. The audio system includes a controller and a loudspeaker. Non-limiting examples of audio systems that can be used in the methods described herein are further described elsewhere herein. Preferably, but not necessarily, method 200 is accomplished using the controller of the audio system and/or an audio system control app on a portable computing device that is arranged to control the audio system.

At step 202 audio data is streamed from a portable computing device to the audio system. The audio data is of a first type that has a first signal type. As one non-limiting example the audio data is streamed using the Bluetooth wireless streaming technology, which is useful for short range communications, and is commonly used for streaming content from a portable computing device such as a smartphone or tablet to an audio system that includes a Bluetooth system. Signal types can be based on the communication protocol being used for the signal (e.g., Bluetooth or WiFi), the communication medium being used (wired or wireless), or the frequency band used to transmit the signals. Wireless WiFi protocols are 802.11 b/g/n (b/g are 2.4 GHz, while 802.11n includes both 2.4 GHz and 5 GHz channels). Wired (Ethernet) protocol is 802.3. Other signal types not described above, whether now known or later developed, are also within the scope of the present disclosure.

At step 204, the source of the data being streamed is identified if possible. Some non-limiting examples of sources of data are described herein, including but not limited to internet audio streaming sources and device playlists. If the source cannot be identified then one or more best-match alternate data sources are identified. Non-limiting manners of identifying sources are described below with reference to FIG. 3A. Non-limiting manners of identifying a best-match alternate source is described below with reference to FIGS. 3A and 3B.

At step 206 a transition trigger is detected. A transition trigger can be an instruction or command to transition from the first type of streamed content to the second type of streamed content. A transition trigger may be based on a user action. Non-limiting examples of such user actions include using the user interface (UI) that is part of the audio system, or the UI that is part of an audio system controller. An audio system controller may be an app that runs on a smartphone or tablet that is designed to allow user control of the audio system and the data or source(s) of data. An example of such an app is described below. A transition trigger may also be automatic as opposed to being based on a user action. Examples of automatic triggers include: when the wireless signal quality has degraded, for example if a device streaming over Bluetooth is moved out of Bluetooth range, or if for any reason the signal or the signal buffering becomes sufficiently problematic that there is danger that the stream will be interrupted. Automatic transition triggers would be pre-defined. The audio system controller would typically be used to detect a transition trigger and direct the next steps. In a case where the Bluetooth signal is lost, the streamed content switch (described immediately below) could occur immediately.

At step 208 the streamed content is switched such that the audio system begins receiving a second type of streamed content that has a second signal type that is different than the first signal type. One example is switching transmission of streamed audio data from Bluetooth to WiFi. Step 208 is typically carried out by the audio system controller. As one non-limiting example, the SoundTouch® wireless system available from Bose Corporation of Framingham, Mass., USA includes both Bluetooth and WiFi technology. This system is constructed and arranged to play a stream that is received, using Bluetooth or WiFi. In some cases, such as with Apple® Music or Spotify, the service (i.e., the content source) is designed to allow content to be moved between devices. If the current source is such a source, then a switch from Bluetooth to WiFi can occur seamlessly via the source.

Figure 3A:
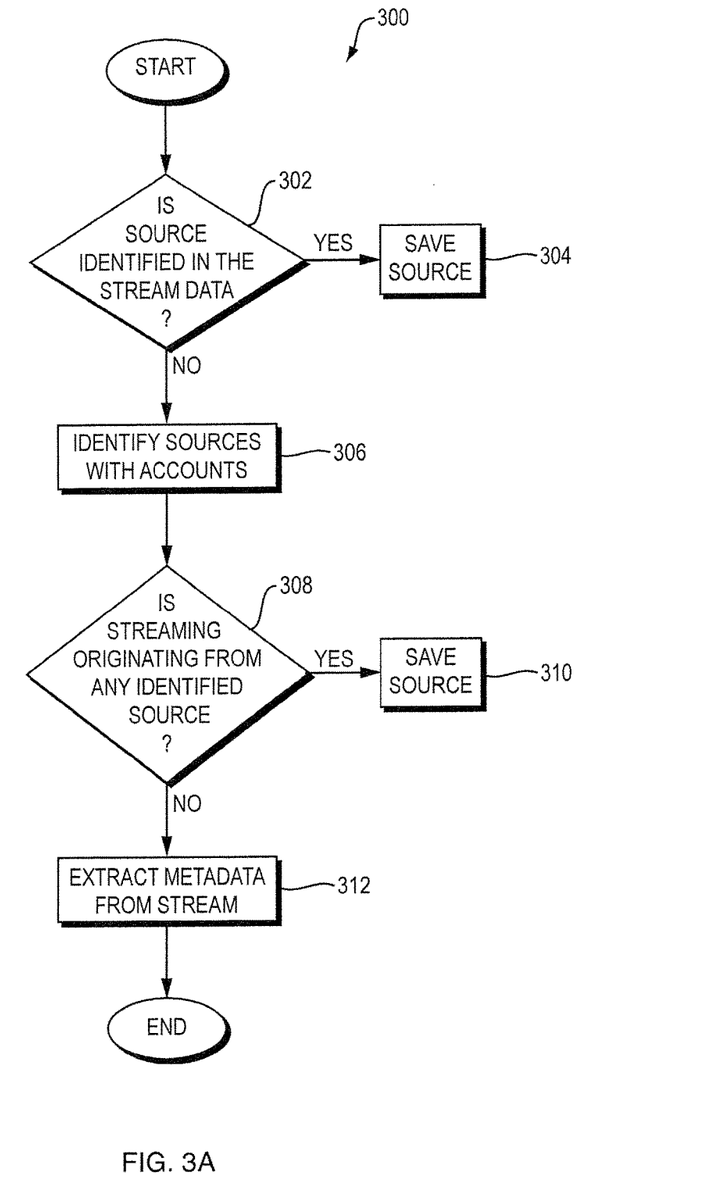
FIG. 3A is a more detailed flow chart of steps involved in identifying a source or identifying a best match alternate source of FIG. 2.

FIG. 3A is a more detailed flow chart of steps involved in an example of step 204, FIG. 2, in which a current source or a best match alternate source is identified. Typically, for a better user experience, if the user wants to switch from Bluetooth to WiFi or if there is an issue with Bluetooth that necessitates a switch to WiFi, it is best to keep playing the same source. Also, if the switch in streamed content occurs between tracks, the switch may be completely unnoticeable from the point of view of the user experience. Thus, it is usually better to attempt to identify the current source before attempting to identify a best match alternate source.

Flow chart 300, FIG. 3A, begins by determining if the current source is identified in the data stream, step 302. If a source of streamed audio data includes in the stream data from which the source can be identified, the source is extracted and saved, step 302. Some sources of streamed audio data, such as Apple Music or Spotify, include an identifiable pattern in their browse list over Bluetooth's Audio/Video Remote Control Profile (AVRCP) interface. The browse trees for most music services are unique, and can be made to support the Bluetooth AVRCP interface. In this case the Now Playing list, or information from which the playlist or identifying features of the music being played can be determined, is extracted, and such information can be saved instead of the source itself. Other manners by which sources or the now playing list can be identified from the stream are also contemplated and are included within the scope of this disclosure.

If the source or other information identified immediately above is not available from the stream, steps 306 and 308 together attempt to identify the current source based on user information, including but not limited to accounts the user has with various sources. These can also be used to fortify the solutions found in step 302. Many internet audio sources and the like require the user to register with the site. If the user has registered, the audio system will be registered with the site. Some services/sources track when a user is streaming and what is being streamed. The audio system can poll known sources (e.g., via an http web service call) to find sources with which the user has registered, step 306. All known sources can then be polled to determine which, if any, are currently streaming to the user, step 308. If such a source is found, it is saved, step 310. If the current source cannot be identified, either by the means described above or in another manner not specifically described herein, at step 312 audio track metadata (or any other data that identifies the audio tracks or that identifies certain qualities or features of the audio tracks) is extracted from the stream.

Figure 3B:
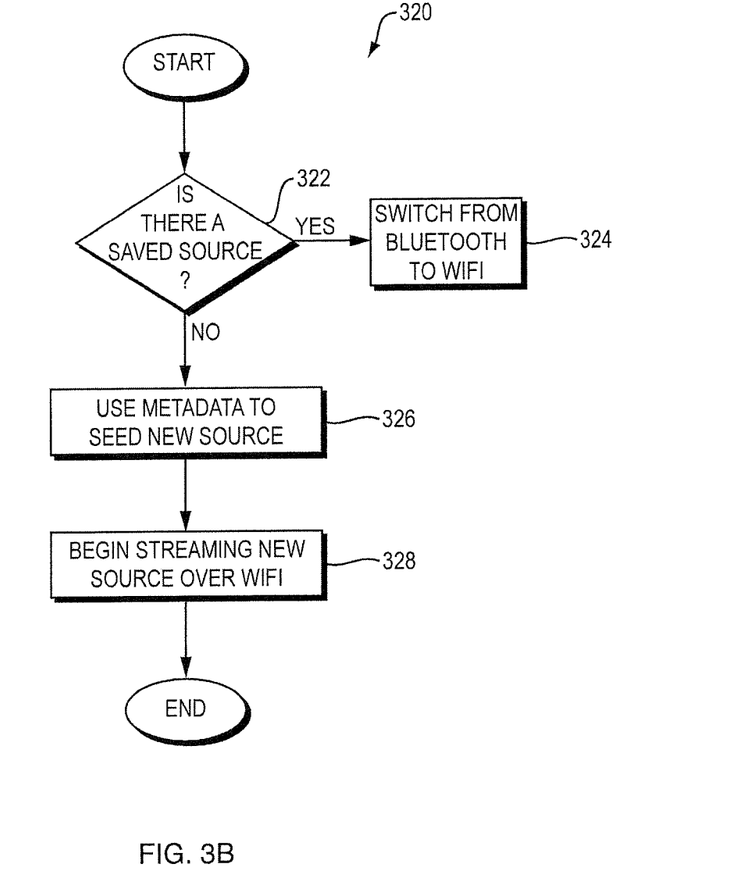
FIG. 3B is a more detailed flow chart of the switch streamed content step of FIG. 2.

FIG. 3B is a more detailed flow chart 320 of a non-limiting example of the switch streamed content step 208 of FIG. 2. These steps occur once a transition trigger has been detected, and as described above preferably occur between audio tracks so there is no discernible disruption of the audio. If there is a saved current source, step 322, the audio system switches from Bluetooth to WiFi, step 324. If there is no saved source, at step 326 the audio system uses the extracted metadata, or other saved information regarding the tracks being played, to seed a new source that has content like the content of the current source, and then begins streaming the new source over WiFi, step 328. Seeding a source using such data is a process known in the art. In one non-limiting example the source that is seeded is the audio system's default source, or perhaps the most commonly used source. Sources that allow for the creation of a new 'station' such as Pandora or iHeart, can be seeded with the last content (track or set of tracks) played, which are readily available in Bluetooth's AVRCP's Metadata API.

Figure 4A:
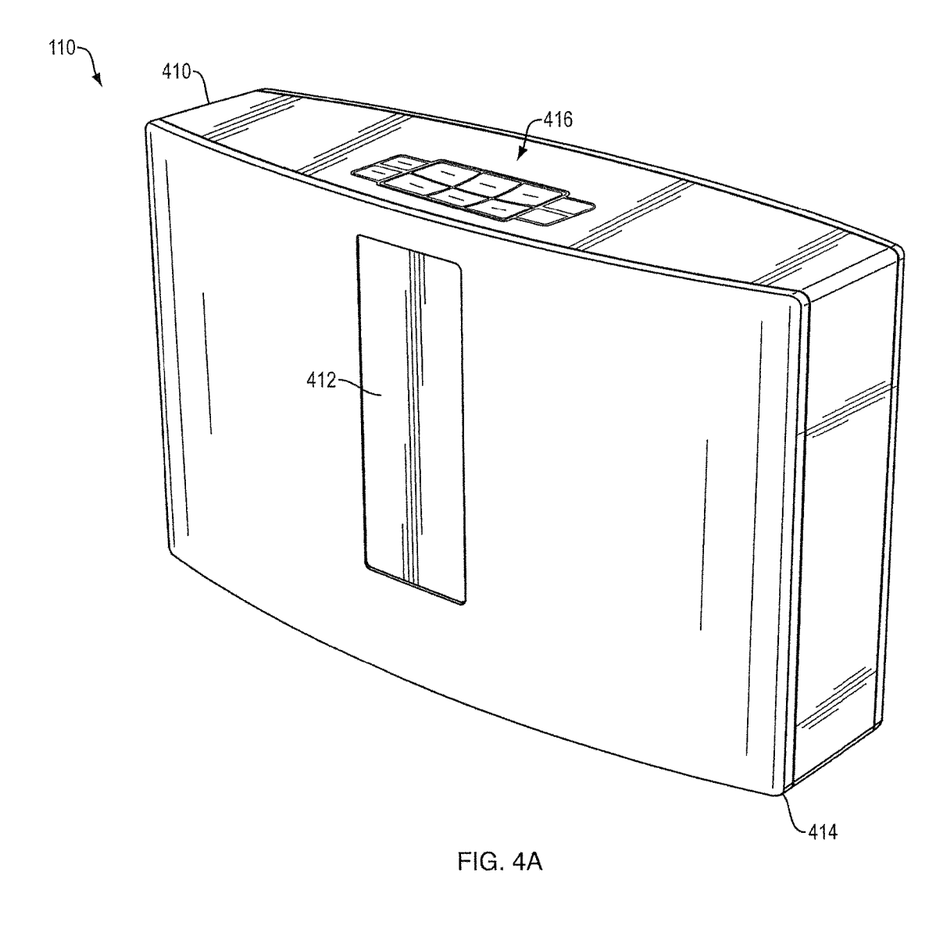
FIGS. 4A and 4B are perspective and top plan views, respectively, of an exemplary audio playback device of the audio system of FIG. 1.
Figure 4B:
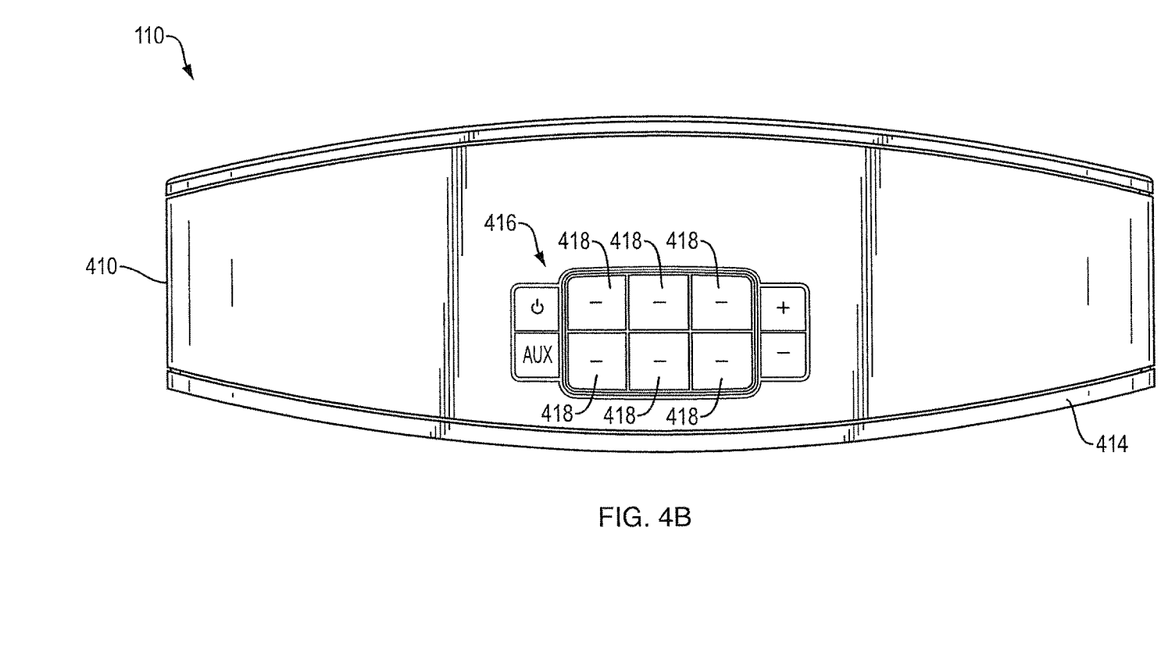
Figure 4C:
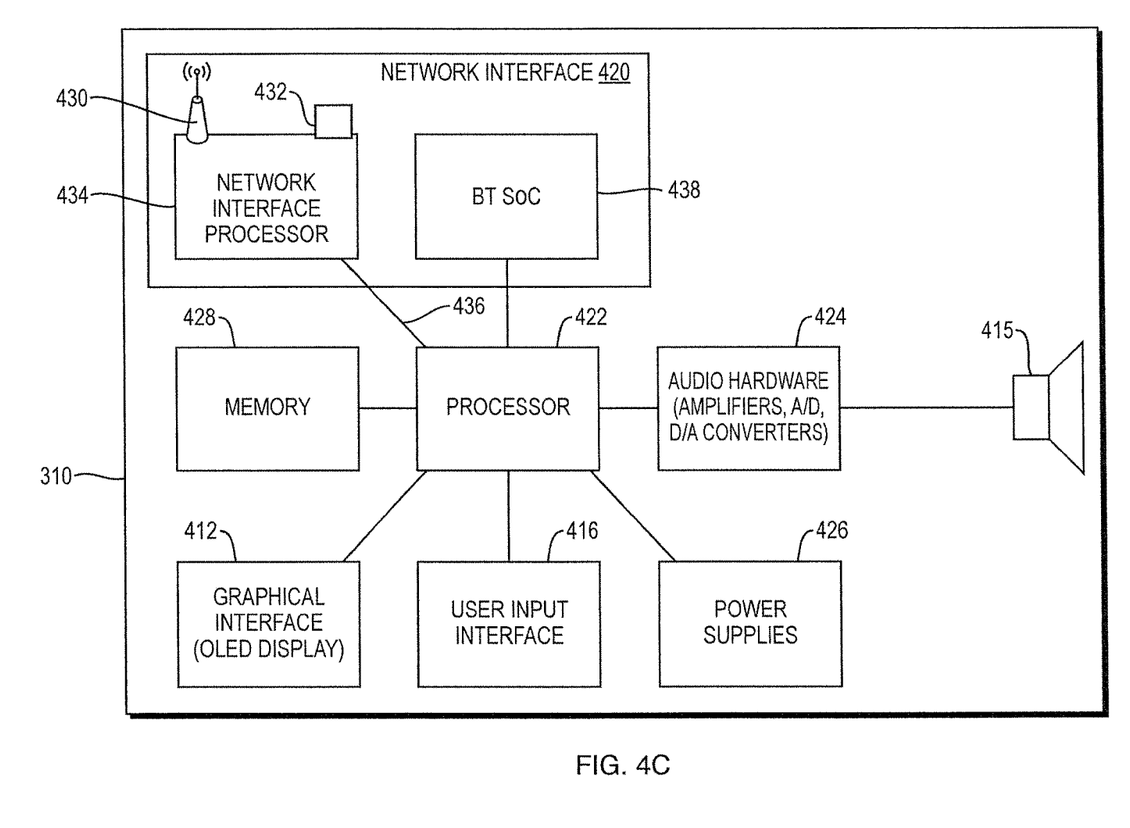
FIG. 4C is a block diagram of the audio playback device of FIGS. 4A and 4B.

An exemplary wireless audio playback device 110 will now be described in greater detail with reference to FIGS. 4A through 4C. Referring to FIG. 4A, a wireless audio playback device 110 includes an enclosure 410 and on the enclosure 410 there may reside a graphical interface 412 (e.g., an organic light emitting diode (OLED) display) which can provide the user with information regarding currently playing ("Now Playing") music, information regarding the presets, and other information such as described above. A screen 414 conceals one or more electro-acoustic transducers 415 (FIG. 4C). The audio playback device 110 also includes a user input interface 416. As shown in FIG. 4B, the user input interface 416 includes a plurality of preset indicators 418, which are hardware buttons in the illustrated example. The preset indicators 418 (numbered 1-6) provide the user with easy, one press access to digital audio sources or entities assigned to those buttons, and potentially to other functions. That is, a single press of a selected one of the preset indicators 418 will initiate streaming and rendering of content from the assigned entity.

The assigned entities can be associated with different ones of the digital audio sources such that a single audio playback device 110 can provide for single press access to various different digital audio sources. In one example, the assigned entities include at least (i) user-defined playlists of digital music and (ii) an Internet radio station. In another example, the assigned entities include individual radio stations provided by an Internet radio site.

Notably, the preset indicators 418 operate in the same manner, at least from a user's perspective, regardless of which entities are assigned and which of the digital audio sources provide the assigned entities. That is, each preset indicator 418 can provide for single press access to its assigned entity whether that entity is a user-defined playlist of digital music provided by an NAS device or an Internet radio station provided by an Internet music service, for example.

With reference to FIG. 4C, the audio playback device 110 also includes a network interface 420, a processor 422, audio hardware 424, power supplies 426 for powering the various audio playback device components, and memory 428. Each of the processor 422, the graphical interface 412, the network interface 420, the audio hardware 424, the power supplies 426, and the memory 428 are interconnected using various buses, and several of the components may be mounted on a common motherboard or in other manners as appropriate.

The network interface 420 provides for communication between the audio playback device 110, the remote server (item 140, FIG. 1), the audio sources and other audio playback devices 110 via one or more communications protocols. The network interface 420 may provide either or both of a wireless interface 430 and a wired interface 432. The wireless interface 430 allows the audio playback device 110 to communicate wirelessly with other devices in accordance with a communication protocol such as such as IEEE 802.11 b/g. The wired interface 432 provides network interface functions via a wired (e.g., Ethernet) connection.

In some cases, the network interface 420 may also include a network interface processor 434. If the audio playback device supports Apple AirPlay® (a proprietary protocol stack/suite developed by Apple Inc., with headquarters in Cupertino, Calif., that allows wireless streaming of audio, video, and photos, together with related metadata between devices), then processor 434 may include network media processor functionality. When network media processor functionality is present, if a user connects an AirPlay® enabled device, such as an iPhone or iPad device, to the LAN 118, the user can then stream music to the network connected audio playback devices 110 via Apple AirPlay®. A suitable network interface processor is the DM870 processor available from SMSC of Hauppauge, N.Y. The network interface processor 434 provides network access (i.e., the Wi-Fi network and/or Ethernet connection can be provided through the network interface processor 434) and can support AirPlay® audio. AirPlay® audio signals are passed to the processor 422, using the I2S protocol (an electrical serial bus interface standard used for connecting digital audio devices), for downstream processing and playback. The audio playback device 110 in this case can support audio-streaming via multiple protocols such as AirPlay® and/or DLNA's UPnP protocol, all integrated within one device.

All other digital audio coming from network packets comes straight from the network interface processor 434 through connection (e.g., USB bridge) 436 to the processor 422 and runs into the decoders, DSP, and eventually is played back (rendered) via the electro-acoustic transducer(s) 415.

The network interface 420 can also include a Bluetooth (BT) system-on-chip (SoC) 438 for Bluetooth applications (e.g., for wireless communication with a Bluetooth enabled controller (not shown)). Suitable BT SoC devices are known in the art and so are not further described herein.

Streamed data pass from the network interface 420 to the processor 422. The processor 422 can execute instructions within the audio playback device (e.g., for performing, among other things, digital signal processing, decoding, and equalization functions), including instructions stored in the memory 428. The processor 422 may be implemented as a chipset of chips that include separate and multiple analog and digital processors. The processor 422 may provide, for example, for coordination of other components of the audio playback device 110, such as control of user interfaces, applications run by the audio playback device 110. A suitable processor is the DA921 available from Texas Instruments.

The processor 422 provides a processed digital audio signal to the audio hardware 424 which includes one or more digital-to-analog (D/A) converters for converting the digital audio signal to an analog audio signal. The audio hardware 424 also includes one or more amplifiers which provide amplified analog audio signals to the electroacoustic transducer(s) 415 for playback. In addition, the audio hardware 424 may include circuitry for processing analog input signals to provide digital audio signals for sharing with other devices in the acoustic system 100.

The memory 428 may include, for example, flash memory and/or non-volatile random access memory (NVRAM). In some implementations, instructions (e.g., software) are stored in memory 428. The instructions, when executed by one or more processing devices (e.g., the processor 422), perform one or more processes, such as those described above (e.g., with respect to FIGS. 2 and 3). The instructions can also be stored by one or more storage devices, such as one or more computer- or machine-readable mediums (for example, the memory 428, or memory on the processor). The instructions may include instructions for performing decoding (i.e., the software modules include the audio codecs for decoding the digital audio streams), as well as digital signal processing and equalization.

Elements of figures are shown and described as discrete elements in a block diagram. These may be implemented using one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in a flow chart or a block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

For example, the concepts described above work not only with dedicated speaker packages, such as illustrated in FIGS. 4A-4C, but also with other wireless audio playback devices that are enabled for wireless communication (e.g., using Bluetooth and/or WiFi) and have a loudspeaker and a processor. There are many devices having these functionalities that could be programmed to accomplish the present methods. One example of a stand-alone wireless audio playback device that can be used is the SoundTouch® wireless system available from Bose Corporation of Framingham, Mass. USA. Another example is the SoundLink® wireless headphones available from Bose Corporation. Stereo systems with wireless functionality can also be used in the methods.

What is claimed is:

1. An audio system that is configured to receive streamed audio content and play the streamed audio content as audio output, the audio system comprising:
   a processor that is configured to:
      receive a first type of streamed content that has a first signal type, wherein the first type of streamed content comprises a plurality of sequential tracks of content data; and
      arrange to begin receiving a second type of streamed content, where the second type of streamed content has a second signal type that is different than the first signal type, wherein arranging to begin receiving a second type of streamed content comprises using information in the first type of streamed content to identify the second type of streamed content, and beginning to play the second type of streamed content after one track has played and before the next sequential track begins to play; and
   an electroacoustic transducer that is configured to play the streamed content.

2. The audio system of claim 1, wherein the first signal type is of a first communication protocol and the second signal type is of a second communication protocol, where the first and second communication protocols are different from one another.

3. The audio system of claim 2, wherein the first communication protocol employs a wireless technology for exchanging data over short distances.

4. The audio system of claim 3, wherein the first communication protocol employs a Bluetooth wireless technology.

5. The audio system of claim 2, wherein the second communication protocol employs a wireless local area network.

6. The audio system of claim 5, wherein the second communication protocol employs a WiFi technology.

7. The audio system of claim 2, wherein the first communication protocol employs a Bluetooth wireless technology and wherein the second communication protocol employs a WiFi technology.

8. The audio system of claim 1, further comprising a wireless network interface.

9. The audio system of claim 1, wherein arranging to begin receiving a second type of streamed content further comprises receiving from a user a command to switch to the second type of streamed content.

10. The audio system of claim 1, wherein the first type of streamed content originates from a first digital audio source, and wherein arranging to begin receiving a second type of streamed content further comprises detecting a change in at least one of the first digital audio source and the first signal type.

11. The audio system of claim 10, wherein the change in at least one of the first digital audio source and the first signal type comprises at least one of a change in signal strength, a change in signal buffering and a change in power level of the first digital audio source.

12. The audio system of claim 1, wherein the first type of streamed content originates from a first digital audio source, and wherein arranging to begin receiving a second type of streamed content further comprises identifying the first digital audio source.

13. The audio system of claim 12, wherein the first signal type is of a first communication protocol, wherein identifying the first digital audio source comprises reviewing data that is specific to the first digital audio source in the first type of streamed content, and wherein arranging to begin receiving a second type of streamed content further comprises arranging for the delivery of streamed content from the first digital audio source over a second communication protocol, where the first and second communication protocols are different from one another.

14. The audio system of claim 12, wherein the first communication protocol employs a Bluetooth wireless technology and the second communication protocol employs a WiFi technology.

15. The audio system of claim 12, wherein identifying the first digital audio source comprises polling a plurality of different digital audio sources.

16. The audio system of claim 15, wherein a user of the audio system has an account with the first digital audio source, and wherein polling a plurality of different digital audio sources comprises screening the plurality of different audio sources to identify one or more audio sources with which the user has an account.

17. The audio system of claim 16, wherein identifying the first digital audio source further comprises selecting one identified digital audio source with which the user has an account based on an identification of the first type of streamed content that is being streamed to the audio system by the digital audio source.

18. The audio system of claim 1, wherein the first type of streamed content originates from a first digital audio source and includes content metadata, and wherein arranging to begin receiving a second type of streamed content further comprises using the metadata with a second digital audio source.

19. The audio system of claim 18, wherein using the metadata with a second digital audio source comprises seeding a second digital audio source with the metadata, so that the second digital audio source provides digital audio data that is similar to the first type of streamed content.

20. A wireless audio playback device, comprising:
a processor that is configured to:
receive a first type of streamed content that has a first signal type with a first communication protocol that employs a Bluetooth wireless technology; and
arrange to begin receiving a second type of streamed content, where the second type of streamed content has a second signal type with a second communication protocol that is different than the first communication protocol, wherein the second communication protocol employs a WiFi technology, wherein arranging to begin receiving a second type of streamed content comprises using information in the first type of streamed content to identify the second type of streamed content; and
an electroacoustic transducer that is configured to play the streamed content as audio output;
wherein the first type of streamed content comprises a plurality of sequential tracks of content data, and wherein arranging to begin receiving second type of streamed content further comprises beginning to play the second type of streamed content after one track has played and before the next sequential track begins to play.

* * * * *